July 4, 1961  R. RAFFAETÁ  2,991,298
PROCESS FOR DEODORIZING EDIBLE LIQUID FATS
Filed Dec. 17, 1956
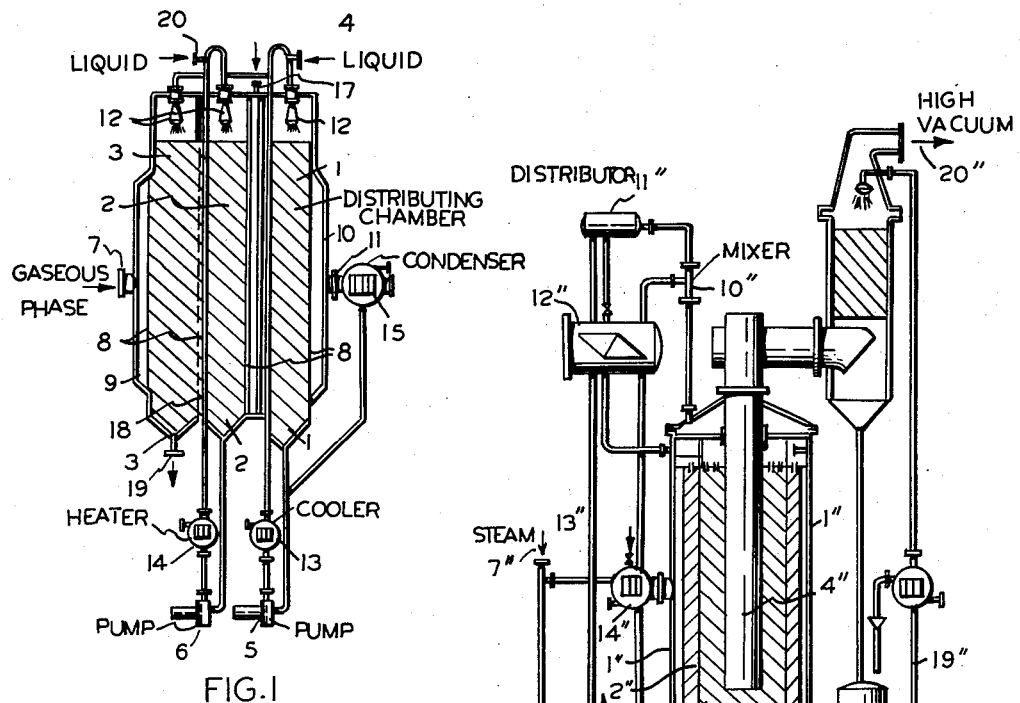
FIG.1
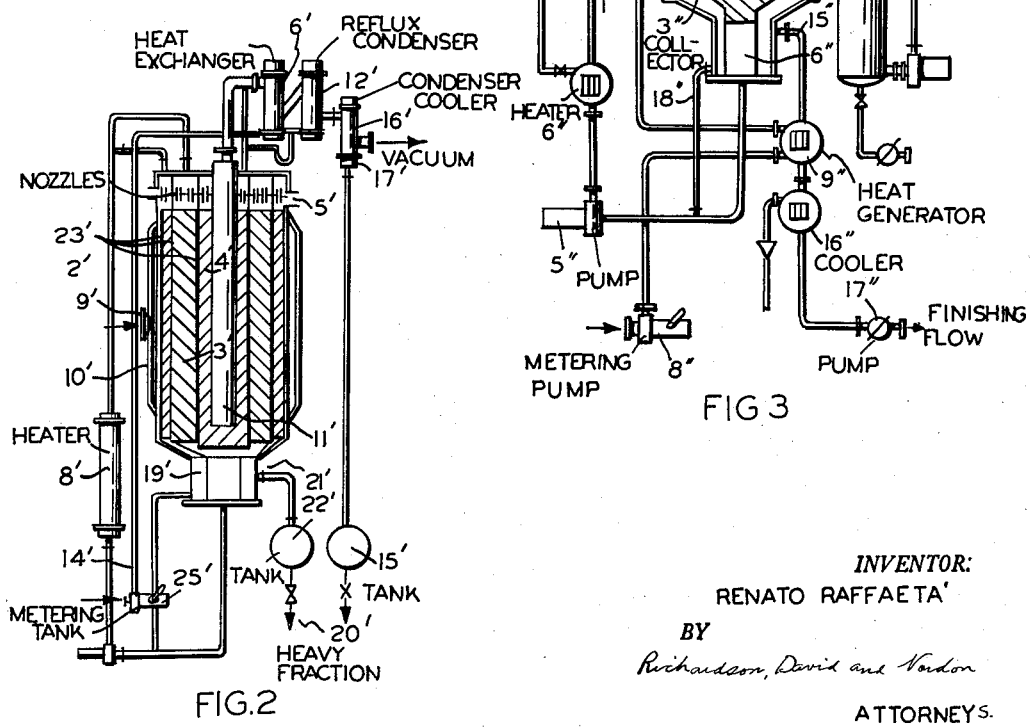
FIG.2
FIG.3
INVENTOR:
RENATO RAFFAETA'
BY
Richardson, David and Nordon
ATTORNEYS.

United States Patent Office 2,991,298
Patented July 4, 1961

2,991,298
PROCESS FOR DEODORIZING EDIBLE LIQUID FATS
Renato Raffaetà, Via Marco Polo, Milan, Italy
Filed Dec. 17, 1956, Ser. No. 628,757
2 Claims. (Cl. 260—428)

It is known how the separation of the components of a liquid mixture is obtained by means of stills and rectifying columns with bubble trays or with perforated plates or packed columns, supplemented by retorts, dephlegmators, condensers, coolers, etc.

Notwithstanding its wide industrial application, that simple method of separation involves considerable inconveniences in many cases where for instance it is required to operate under high vacuum, in order not to cause alteration of certain compounds which are unstable at boiling temperature under atmospheric pressure.

Since in fact in rectifying columns losses of pressure in the flow of vapours passing through them are considerable, and are even necessary for the efficiency of said columns, the latter of course are not well suited for operating at reduced pressure. Also packed columns, which involve smaller pressure losses than the other types, do not afford satisfactory results.

Moreover, in the cases in which it is essential to use auxiliary vapours in very high vacuum such as in the fractionation of fatty acids or in continuous deodoration of edible oils, using a rectifying column wherein the oil is made to drip from the top to the bottom countercurrent to the vapour, there is established, owing to the effect of the above mentioned pressure losses, a maximum absolute pressure at the bottom of the column. On the contrary it would be desirable to have the maximum degree of vacuum to remove from the oil the last traces of odorous substances which are the most difficult to be eliminated.

It is an object of this invention to improve the separation of the components of a liquid mixture by distillation and rectification.

According to the invention there is provided a process for the gas or vapour treatment of a liquid mixture in order to separate at least one component of said mixture, wherein the liquid mixture is caused repeatedly to fall under the effect of gravity and in finely divided form through enclosures that are bounded by vertical apertured walls through which a gas or vapour is caused to flow transversely in relation to the falling liquid mixture. The single liquid phase constituted by this liquid mixture desirably falls vertically through the stripping apparatus in two or more liquid streams.

This process allows the components of a liquid mixture to be easily separated, and in particular edible fats to be deodorized in a continuous cycle, under the most convenient physical operating conditions, and overcomes the drawbacks of the conventional distillation or fractional distillation methods mentioned above.

The movement of the two phases considered is on the whole countercurrent, the liquid flow being directed, by means of appropriate lifting means from one compartment to the subsequent one counter the movement of the gaseous phase.

The composition of the liquid flows and of the gaseous phase varies while passing from one vertical baffle to the subsequent one, by mutual action between the two phases, as well as by intervention therein of external means determining evaporations, condensations, heating, cooling, separating and so on. The composition of the liquid and gaseous phases varies also on the individual vertical planes, obtaining effects which will be dealt with hereinafter.

The liquid collected at the base of each compartment can be sent, by the pipings and lifting means provided therefor, in part to the special head distributor of the subsequent compartment and in part to the same compartment from which the flow comes, thus determining a more or less abundant recycle of the same flow in the same compartment.

The instant process will be more fully understood with reference to the diagrammatical representation of FIG. 1 in the accompanying drawing. The objects, advantages and industrial applications of the present invention appear from the embodiments illustrated in FIGURES 2 and 3 of said drawing.

Referring to FIGURE 1, liquid streams formed by a liquid mixture entering the apparatus at 4 fall through vertically disposed enclosures 1, 2 and 3. Centrifugal pumps 5 and 6 are provided at the bottom of the apparatus for lifting the liquid to be deodorized. The gaseous stripping phase enters the apparatus at 7 and flows through the vertical enclosures 1, 2 and 3 in a transverse direction to the vertical liquid flow.

A distributing chamber 9 feeds the gaseous phase into the enclosures 1, 2 and 3 through orifices provided in the vertical walls 8 thereof, the gaseous phase flowing in substantially horizontal stream lines successively through the enclosures 3, 2 and 1. The gaseous phase leaves the enclosure 1 through an outlet chamber 10 and an outlet 11. The orifices provided in the apertured walls 8 are constructed so as to allow a satisfactory spreading of the gaseous phase passing through the vertical enclosures while impeding the passage of the liquid phase through these walls.

In the constructional form of FIGURE 1, the compartments 1, 2 and 3 are left void so as to permit free falling of the liquid phase that is dispersed by means of sprayers 12. However, it will be appreciated that the liquid phase that is supplied to the vertical enclosures 1, 2 and 3 may be dispersed in other conventional ways, as by means of horizontal plates which spread the falling liquid into a succession of streams, or by means of filling materials, such as Raschig rings, or by means of vertical spreading members.

The gaseous phase as well as the liquid streams may be subjected, preferably outside the distribution and contact assembly, to various external effects according to the purpose of the separation process, e.g. the vapours may be subjected to liquefaction-distillation reactions, and to heating, cooling and separating actions.

Thus, in the constructional form of FIGURE 1, a cooler 13 is provided for the gas stream leaving the enclosure 1, and a heater 14 is provided for the liquid leaving the enclosure 2. Similarly, a condenser 15 is connected to the outlet 11 for receiving gaseous phase. The condensate from the condenser 15 is combined through a pipe 16 with the liquid leaving the bottom of the enclosure 1.

The gaseous phase entering at 7 may be constituted by auxiliary vapours, in particular by steam, as a selective agent, cleaning agent or stripping agent for the light components contained in the liquid flows. One or more gaseous phases coming e.g. from partial distillations of the liquid flows may be introduced for specific purposes through connections such as e.g. at 17 into compartments such as 18.

At the bottom 19 of compartment 3 there may be collected the heavy fraction of a liquid mixture entering at 4, while the light fraction may be obtained from the condensation of the residual vapours leaving the condenser 15.

It will be appreciated that the gaseous and liquid phases may be still mixed in the counter-current if the liquid mixture to be treated enters the apparatus at 20 with the liquid flow passing through the enclosure 2. In that case the flow of liquid through enclosure 1 is generated by the vapours condensed in the condenser 15.

The composition of the liquid and gaseous phases varies obviously also in vertical sense on the very planes parallel to the partitions 8. This variation of composition ensures e.g. an intensive stripping effect of the light components from the heavy fraction extracted at 19.

FIG. 2 represents diagrammatically one embodiment of the process as applied to the decomposition by means of auxiliary vapours in vacuo, of a binary mixture.

The apparatus equipment is essentially constituted by a still of vertical cylindrical shape 1' carrying inside four cylindrical baffles coaxial with the shell and permeable to the gaseous phase and confining three packed cylindrical zones 2', 3' and 4'. The zones are confined at top by the horizontal plate 5' carrying the nozzles for distributing the liquid flows. The flows attain the respective sets of nozzles through special connections and distributing devices in the lid.

The entering binary mixture to be decomposed is conveyed by the measuring pump 25' to the internal cylindrical zone 4' after having been pre-heated by means of the exchanger 6'. This flow joins—at the base of the still 1'—the flow recycled by means of the centrifugal pump 7' which recycles it for the part to the zone 3' after passing through the heater 8'. A smaller portion of said flow is conveyed to the external zone 2' where the auxiliary vapour entering at 9' and distributed by chamber 10' eliminates therefrom the last traces of light components. On attaining expansion 19' this flow constitutes the heavy fraction 20' which after leaving the overflow 21' is collected in the tank 22'.

The mixed vapours enriched with the light fraction pass through the zones 2', 3' and 4' and reach the conduit 11', then the reflux condenser 12' after undergoing a partial condensation in the regenerator 6'. The vapours condensed at 6' and at 12' constitute together with the mixture of the conduit 14' the flow flowing through the innermost zone 4' of the still. From the condenser 12' the residual vapours, after condensation in the condenser-cooler 16', are conveyed as a light fraction to the tank 15'. To the condenser cooler 16' there is applied at 17' the vacuum system constituted e.g. by steam jet exhausters with multiple stages and intermediate coolers.

It will be noted at once that the loss of pressure of the vapours passing through the permeable baffles 23' and the packed zones (being packed e.g. with Raschig rings) is reduced to minimum, due to the large cross sections of the section passed through. Hence, this allows for temperatures of distillation which are much lower than those needed with conventional processes. Because the evaporation of a mixture added to a recycle flow of large volume requires heating of the overall flow to a temperature only slightly higher than the distilling temperature of the mixture in a medium at lower pressure as happens in the passage of flow from the heater 8' to the zone 3'. If on the contrary the same mixture is heated by means of a heater or external oven, as is the case at present in the distillation of petroleum and of fatty acids in order to absorb the sufficient latent heat of distillation, it must be heated to a temperature far higher than the distillation temperature at the same reduced pressure.

The instant process, therefore, appears particularly convenient for treatments in vacuo of products which are liable to decompose at elevated temperatures as is the case of fatty acids.

It is further of very high interest to consider that fractionation and rectification in general of the mixtures having industrial interest, are made considerably easier by the reduction of the operating pressure, which means the practical possibility of obtaining absolute alcohol by operating at a pressure only slightly lower than ordinary pressure, without any need for having recourse to a third component as required instead at atmospheric pressure.

Thus, the rectifying effect of recycle, of the auxiliary vapours and the improved equilibrium conditions in vacuo for the purposes of rectification, ensure with this process considerable advantages with respect to conventional processes.

The apparatus according to the present invention is economical in construction and above all it has much smaller space requirement than conventional fractionating columns which always involve elevated cost of buildings.

Moreover, an advantage of this process is the great flexibility in operation obtainable with the installation for embodying it with the variations of the flow deliveries fresh and recycled as well as by means of adjustments on the external heating and cooling means.

The process according to the present invention is applicable also to a ternary or quaternary mixture, by means of a very simple series arrangement of two or more stills with recycled flows, with their respective apparatus equipment and auxiliary accessories as considered above.

Moreover, there is a possibility of taking off intermediate liquid or gaseous flows such as medium fractions, in one single still according to the invention and of convenient construction.

The apparatus for carrying out the process even if involving the use of auxiliary vapours in vacuo or not, and of motive power for generating recycles, nevertheless there is less expense for installation and operation than conventional apparatus comprising rectifying columns which require much space and also refluxes of condensed vapours.

Another typical application of the process, relating to the continuous deodoration of edible fats will now be described.

FIG. 3 of the accompanying drawing illustrates the process for deodorizing in continuous cycle edible fats, wherein an extensive extraction of the volatile components contained in a given liquid is carried out, which is not distillable in practice. The process is analogous to the simple distillation of fatty acids from acidic fats; the fraction which is not distillable is represented by triglycerids i.e. by the neutral portion of the fat, which can be separated unaltered, due to the low treating temperature, and well-exhausted from free acids.

The still 1" is constituted by a vertical cylindrical shell with air-tight (vacuum-tight) conical or cup-shaped bottoms. Three cylindrical baffles coaxial with the shell divide the still into three annular cylindrical compartments 1", 2" and 3" and cylindrical conduit 4". The baffles are made of perforated sheet steel or of sheet-metal with tangential pockets or tangential laminae so as to impart a turbulence or vortex movement to the vapours passing therethrough.

By means of the centrifugal pump 5" there is obtained an active recycle of the fat under treatment which is taken from the collector 6" placed at the base of the still and heated by the heater 6"-bis which is steam-operated at medium pressure (15–20 atm.), re-admitted to the still 1, where by means of a special distributing device it is made to drip onto the packing material of e.g. Raschig rings and placed within the annular space 3".

The fused fat or oil to be deodorized is fed by the measuring pump 8" which through the heat regenerator 9" adds it to the flow recycled through the mixer 10".

An aliquot of the recycled flow, the so-called finishing flow slightly higher than the fresh oil feed, is taken from the distributor 11" and is introduced into the annular compartment 2" which too contains packing material. The flow variator 12" is adapted to ensure a more uniform and extensive distribution of this flow (which is in an amount much reduced as compared with the recycled flow) upon the large-surface packing material.

The finishing flow will be firstly invaded by all the degassed steam 13", superheated and expanded in the exchanger 14" operated by medium pressure saturated steam 7" (15–10 atm.).

The flow of superheated steam acting at the residual pressure of 2–3 Torr. existing in the still, will be able to remove from the finishing flow the last traces of volatile products and of free fatty acids still present in the fat. The same steam in passing then through the recycled flow will enrich—prior to leaving the still—with the mentioned distillable products, thus affording a high heat efficiency of the apparatus.

The finishing flow leaves the still through the overflow 15", then by means of the heat regenerator 9" and of the water cooler 16" it is extracted at the desired temperature from the pump 17" or else it reaches a tank under vacuum from which it can be extracted periodically. The excess of finishing flow with respect to the delivery of fresh oil feed, is recycled with the aforesaid recycle flow by means of the piping 18".

From the mixed vapours leaving the still there is recovered the fraction distilled from the fat by means of the assembly 19", also in order to avoid pollution of the cooling water necessary for the device provided to obtain high vacuum as applied at 20".

Without discussing in detail the advantages afforded by the application of the process of FIG. 3 over conventional continuous or batch deodorizing processes, which advantages by the way appear from the preceding description of the process, it may be pointed out how in this specific case the action of steam is not of exclusively physical character, i.e. of merely auxiliary effect in removing volatile substances from the fatty material. The steam has an important function in deodorizing, thanks to its hydrolyzing action upon certain unstable compounds adapted to be transformed into odorous products and into products having no neutral taste.

From what has been set forth hereinbefore it is evident, that the apparatus of FIG. 3 is indeed capable of insuring effective and uniformly extensive physical as well as chemical action of steam on the whole mass of fatty substances to be treated, so as to warrant really the most effective and stable deodorizing of fats with a very much reduced consumption of heat energy.

The consideration hereinbefore set forth about the chemical action of steam makes it clear how in the process according to the present invention the effect of the gaseous phase or of the auxiliary vapours upon a liquid phase under treatment, may have also a chemical character involving true and proper phenomena of chemical reaction.

I claim:
1. A process for deodorizing edible fats in liquid form containing odorous volatile components comprising the steps of dividing the liquid into a plurality of streams, dropping said streams so that they fall freely vertically by gravity, passing a vapor derived from a source other than said liquid horizontally through the freely falling streams, extracting some of the odorous volatile components from said streams, drawing off the extracted volatile components mixed with the vapor, collecting the remaining liquid at the end of the free fall thereof, dividing the remaining collected liquid into a plurality of other streams, dropping said other streams so that they fall freely vertically by gravity, passing additional vapor derived from said source other than said liquid horizontally through the freely falling other streams, extracting further odorous volatile components therefrom, drawing off the further volatile components mixed with the additional vapor, and collecting deodorized residual liquid at the end of the free fall of said other streams of liquid.

2. A process according to claim 1, wherein said vapor is steam.

References Cited in the file of this patent

UNITED STATES PATENTS

| | | |
|---|---|---|
| 103,602 | Gray | May 31, 1870 |
| 441,106 | Monsanto | Nov. 18, 1890 |
| 489,147 | Golding | Jan. 3, 1893 |
| 631,461 | Guillaume | Aug. 22, 1899 |
| 651,190 | Ilges | June 5, 1900 |
| 986,365 | Corliss | Mar. 7, 1911 |
| 1,874,849 | Danforth | Aug. 30, 1932 |
| 2,078,841 | Fauth | Apr. 27, 1937 |
| 2,645,467 | Rupp | July 14, 1953 |
| 2,764,533 | Oetjen et al. | Sept. 25, 1956 |
| 2,829,710 | Paasch | Apr. 8, 1958 |
| 2,863,808 | Markels | Dec. 9, 1958 |